Feb. 25, 1964  C. SHEER  3,122,672
PLASMA JET ARC DEVICE
Filed Feb. 9, 1961  2 Sheets-Sheet 1
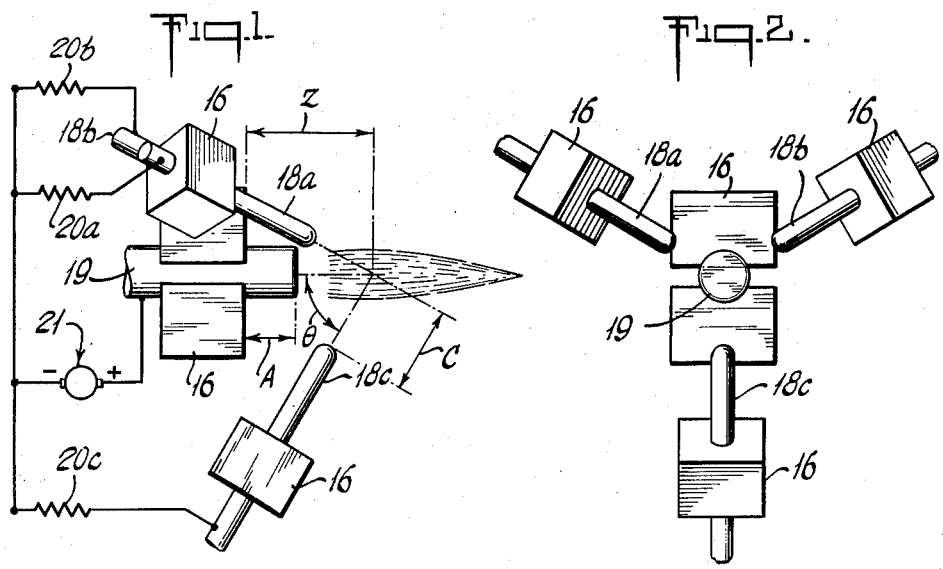
INVENTOR
CHARLES SHEER
BY
ATTORNEY United States Patent Office 3,122,672
Patented Feb. 25, 1964

3,122,672
PLASMA JET ARC DEVICE
Charles Sheer, Teaneck, N.J., assignor to Sheer-Korman Associates, Inc., New York, N.Y., a corporation of Delaware
Filed Feb. 9, 1961, Ser. No. 88,068
1 Claim. (Cl. 313—307)

This invention relates to a new form of hierarc making possible new forms of control and adapting it to new uses.

In the high intensity arc, or hierarc, involving as it does one anode and one cathode, stable operation requires that the angle between the anode and cathode be appreciably less than 180°, that is, they shall not be in alignment. In contrast, the conventional or low intensity arc is most stable with a collinear geometry for the electrodes (anode-cathode angle=180°). The special features of this invention are that the high-intensity arc, which is of the triple cathode type, in which the anode-cathode angle is less than 90°, that is, all the cathodes are directed to a common point in front of the anode.

Recently, a number of applications of the high intensity arc principle have emerged for which the geometry used in the light source application is not the most suitable. When the energy transfer principle of the high intensity arc is used to establish a hierarc, the entire tail flame is used as an ultrahigh temperature medium and for such purposes the searchlight electrode configuration interferes with free access to the flame.

For example, when the tail flame is used as a chemical reaction zone, it is often desirable to inject gaseous reactants into it at various points along its path. In this respect the configuration of the high intensity arc searchlight is inconvenient because of the nonsymmetrical nature of the electrode geometry with respect to the axis of the flame.

In order to inject such gases for uniform distribution into the hotter portion of the tail flame, it is necessary to use a number of gas jets disposed symmetrically about the tail flame axis. Such symmetrical injection of the gases is required in order to obtain smooth, nonturbulent mixing of the injected gases with the flame vapors. Otherwise excessive turbulence and dissipation of the high temperature plasma zone results.

The disposition of a cathode along with its brush contacts and drive mechanisms at the 123° angle with respect to the anode, i.e., at an acute angle with the extension of the tail flame axis precludes uniformity of gas content and may preclude satisfactorily symmetrical gas injection into the flame.

In the accompanying drawings,

FIG. 1 is a diagram of the new form of hierarc which forms the basis of this invention;

FIG. 2 is an end view of the apparatus of FIG. 2;

Figure 3:
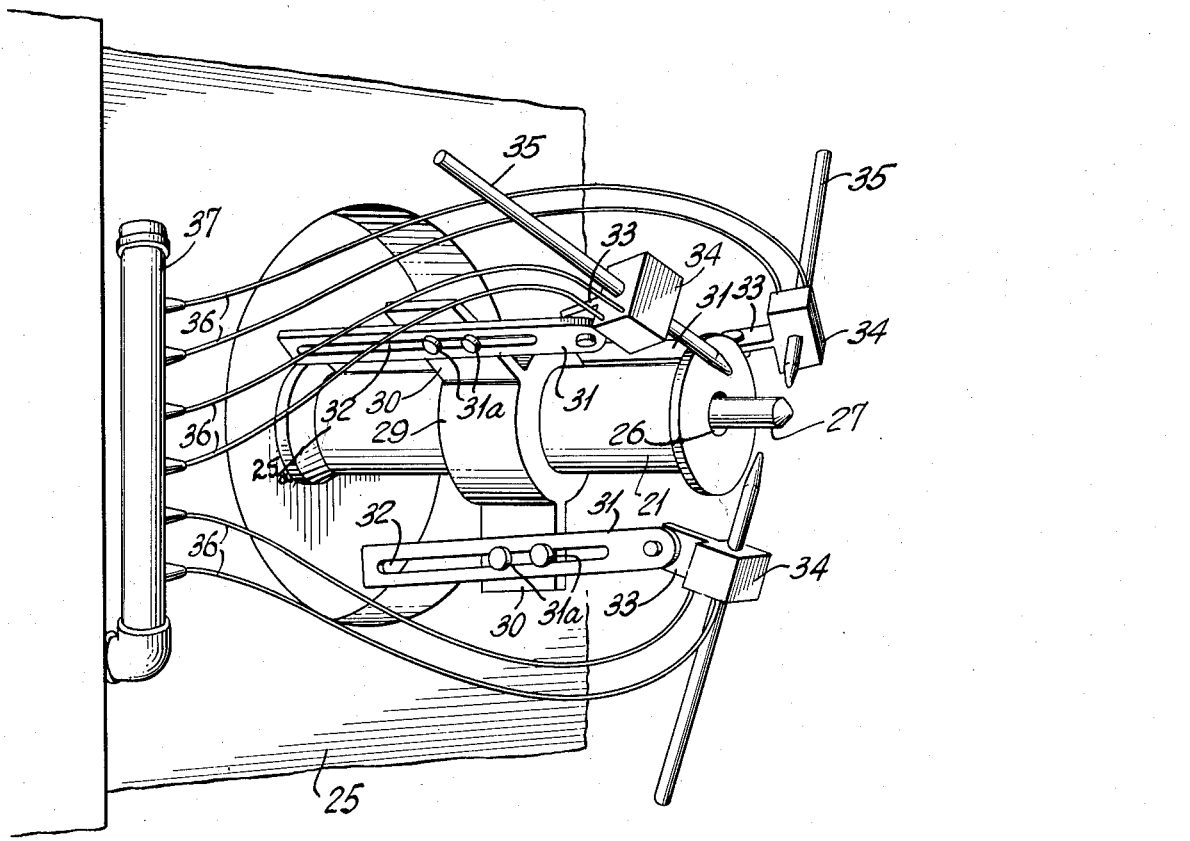
FIG. 3 is a more detail figure showing more fully the apparatus as it has been in use.

The disclosure of the present invention as shown in FIG. 1 relates to a new configuration of electrodes by means of which a high intensity arc may be operated, either for maximum light intensity, or for operation in the hierarc mode, and which provides simultaneously maximum stability and accessibility to all regions of the tail flame.

A further novel feature of this new geometry is that it may be used to cause the plasma flame of anode vapors to issue in a straight line along the projection of the anode axis, or, within limits, to control its direction at will. These features cannot be achieved with the electrode configurations heretofore used. The structure has also a practical advantage that the arc equipment may be constructed in essentially linear spatial arrangement. Since a practical equipment includes provision for successive insertion of anodes in line with the anode being burned, there is provided a feed mechanism for continuously advancing the burning anode, a chamber to contain the tail flame which under some conditions of operation may be many feet long, followed by heat exchangers and/or equipment to collect a flame condensate. These apparatus are not here illustrated. The capability of designing the overall equipment in a horizontal linear array provides a considerable simplification of the structural design, and therefore less costly apparatus.

A further advantage of this equipment is that in the configuration of maximum stability, the entire tail flame from the anode crater to the tip is completely clear of electrode structure, providing accessibility over a 360° angle around the flame axis for its entire length.

A still further advantage of the new configuration is the capability of varying the position of the flame with respect to the axis, over an angular range, in any azimuth, while maintaining maximum stability of operation. This permits the possibility of rapidly changing the direction of the flame by mechanical control so as to impinge successively on a variety of targets located downstream, without interruption of arc operation.

Finally, it has been found possible, with the new geometry, to vary the dimensions of the flame for a given set of operating conditions without interfering with stability. For example, the width and length of the tail flame may be adjusted over a range of approximately 2:1 without interfering with its operation in any other respect, a feature which is not attainable with any arc configuration known in the prior art.

The essence of this invention is the utilization of three cathodes, $18a$, $18b$ and $18c$ in conjunction with a single anode 19 in the configuration illustrated in FIG. 1 and in FIG. 2. Each of the three cathodes, in addition to the anode, is supplied with its own set of water-cooled brush contacts 16 to provide the electrical connection for current flow, as well as individual separately controlled drive and support mechanisms not shown, which permit each individual electrode to be advanced or retracted in the direction of its axis.

The following parameters are shown, A is the protrusion of the anode beyond its brush; C is the distance between the cathode tips and the point of intersection of the electrode centerlines; $\theta$ is the angle between the cathode and center line of the anode; Z is the distance between the brush and the intersection of the cathode center lines.

The cathodes $18a$, $18b$ and $18c$ as here illustrated are disposed symmetrically, i.e., in angular planes 120° from each other about the anode axis. The optimum angle between the axis of each cathode and that of the anode for a maximum stability (marked $\theta$ in FIG. 1) has been found to be about 60°. However, reasonably stable operation can be obtained when $\theta$ is varied between 30° and 90°. Beyond 90° the axial direction of the tail flame is still maintained but the stability of the flame and the degree of lateral accessibility is decreased rapidly.

Although the three cathode-anode arc circuits are operated essentially in parallel, it has been found desirable to insulate the electrical connections to each cathode until the leads are brought out and a resistance $20a$, $20b$ and $20c$ is inserted in series with each cathode as above described. The leads from the resistance are then joined together to the negative terminal of the power source at 21. The function of the series resistances is to stabilize the operation of the triple-cathode arc against relatively large variations in the individual arc conduction paths from each cathode to the common anode, which occur when it is desired to establish relatively large variations in individual anode-cathode gap distances (parameter C in FIG. 1). It has been found that if these stabilizing resistors are omitted and the gap distance, C, for any one cathode is increased significantly over that of the other two, then the discharge from the more remote cathode has a tendency to become extinguished, upsetting symmetrical operations and causing severe instability.

As in the construction of FIGS. 1 and 2, the separate cathodes 35 are connected to the negative side of the source of power through separate resistances 20a, 20b and 20c to effect a stable multiple arc path operation and to assist in controlling the current through the separate cathodes.

In FIG. 3 of the drawings there is shown the essential parts of the new device as actually constructed and operated.

In this embodiment there is shown a vertical base 25 to which is attached a horizontal cylindrical mount 25a, having at one end a hollow socket 26, and adapted to house the coaxial anode 27, together with its drive mechanism and brush contacts (not shown).

A sleeve 29 mounted on the cylinder 25a has three radially outstanding flanges 30 spaced equally around the circumference. Attached to each flange is a horizontally extending arm 31 screwed to the flange, but said arms are horizontally adjustable by reason of the fact that the screws 31a pass through slots 32.

Pivoted to the end of each arm is a bracket 33 carrying a brush 34 which in turn supports a cathode electrode 35, and also serves as the electrical brush contact for said cathode. By reason of the pivotal support of bracket 33 the electrode can be held at any angle to the anode, and by reason of the slots 32 the brush 34 can be adjusted to any desired horizontal distance with respect to a given anode position.

Moreover, since the electrodes are independently adjustable in the brush, the plane defined by the three cathode tips may be adjusted at will.

Since the parts 29, 30, 31 and 33 are usually fabricated of a convenient structural metal, such as steel, it is important that a layer of electrical insulation (not shown), such as thin sheet of mica, be interposed, either between flange 30 and arms 31, or between arm 31 and bracket 33, so as to electrically isolate each cathode and prevent their being mutually short-circuited through sleeve 29. Electrical connections for each cathode (not shown in FIG. 3) may be attached directly to each brush contact holder 34, and brought out separately.

Each of the brushes 34 may be cooled by a circulating fluid fed to and from the brush by conduits 36 leading to and from a water supply manifold 37 which are conventional and which are here conventionally shown. These conduits however are either of insulating tubing or are connected to the manifold 37 by insulating connectors (not shown) in order that the various cathodes shall not be mutually short circuited through the water conduits 36 and manifold 37.

The electrical connection within the cylinder 25a (not shown) energizes the anode from the positive side of a source of power.

The resistances in series with the individual cathodes may be of a magnitude of .02 ohm or less. I have found that individual resistances of this magnitude will maintain all three arc discharges in steady operation even when the separate cathode currents are varied over a range of two to one.

In actual operation, the arc is established by advancing one of the three cathodes to touch the anode which is initially advanced to a somewhat extended position, then first retracting the anode slightly, and finally the cathode. This ignites the first of the three cathodes, and produces the arc flame. Then the other two cathodes are successively extended until a discharge is established between them and the arc flame. Each cathode is then successively retracted to its operating position. The direction of the tail flame is controlled by adjusting the parameter, C, for each of the three cathodes. When the values are equal for the three cathodes the tail flame emerges along the anode axis. It may be made to deviate from the axis by any desired angular distance up to a maximum of about 20° on each side of the axis, and in any desired azimuthal position about the axis.

It has also been found possible to vary the width and length of the tail flame simultaneously by the adjustment of the same parameter, C, along with the parameter labeled $\theta$, in FIG. 1. Thus, for a given value of $\theta$, an increase of the parameter C will cause the flame to shorten and increase in diameter, while decreasing C will cause it to lengthen and decrease in diameter. Moreover, this variation in flame dimensions can be accomplished without changing the flame direction by adjusting the relative values of C for the individual cathodes so that these maintain a constant ratio to each other. Thus if it is desired to direct the flame along the axis of the anode while varying the width and length of the tail flame, the parameter C is varied, while maintaining equal values of C for all three cathodes.

As an example of the degree of variation possible, when this arc configuration was operated in a chamber pressure of 76 mm. Hg with the geometry specified ($\theta=60°$, $Z=3.5$ cm., $A=2$ cm.), then for a value of $C=2$ cm. for each of the three cathodes, a stable flame, directed along the anode axis, 3 feet in length and 2½ inches in diameter, was observed. By decreasing the value of C for each cathode to 1 cm., the flame length increased to 5 feet, and the diameter to 1 inch.

It has been found that a partial accomplishment of the above results can be secured by the use of only two cathodes, coplanar with the anode in position. However, this is a less preferred arrangement than the triple cathode, since adjustment of flame axis in the direction perependicular to the electrode plane is impossible and stability of position is not as great as when three cathodes are used in the symmetrical geometry of FIG. 1. Obviously, four or more cathodes can also be used, but no significant advantage has been found to compensate for the added complexity.

What I claim:

A device for producing a controllable plasma jet comprising a central anode upon a center line and three cathodes, means for supporting said cathode on inclined center lines surrounding said anode and inclined at an angle to intersect said anode center line beyond the face of the anode, said cathodes being equally spaced around the center line of said anode and being each negatively energized relative to said anode sufficient to produce a tail flame, whereby a common tail flame is projected from said anode in a direction away from said anode.

References Cited in the file of this patent

UNITED STATES PATENTS

| | | |
|---|---|---|
| 1,479,370 | Coffin et al. | Jan. 1, 1924 |
| 2,491,178 | Hawkins | Dec. 13, 1949 |
| 2,677,771 | Turner | May 4, 1954 |
| 2,964,678 | Reid | Dec. 13, 1960 |

OTHER REFERENCES

"New Bulletin on Hansen," "ARC Torch," Welding Engineer, December 1930, page 50.